March 29, 1932. J. W. PUTERBAUGH 1,851,325
MIXING MACHINE
Filed April 8, 1929 2 Sheets-Sheet 2
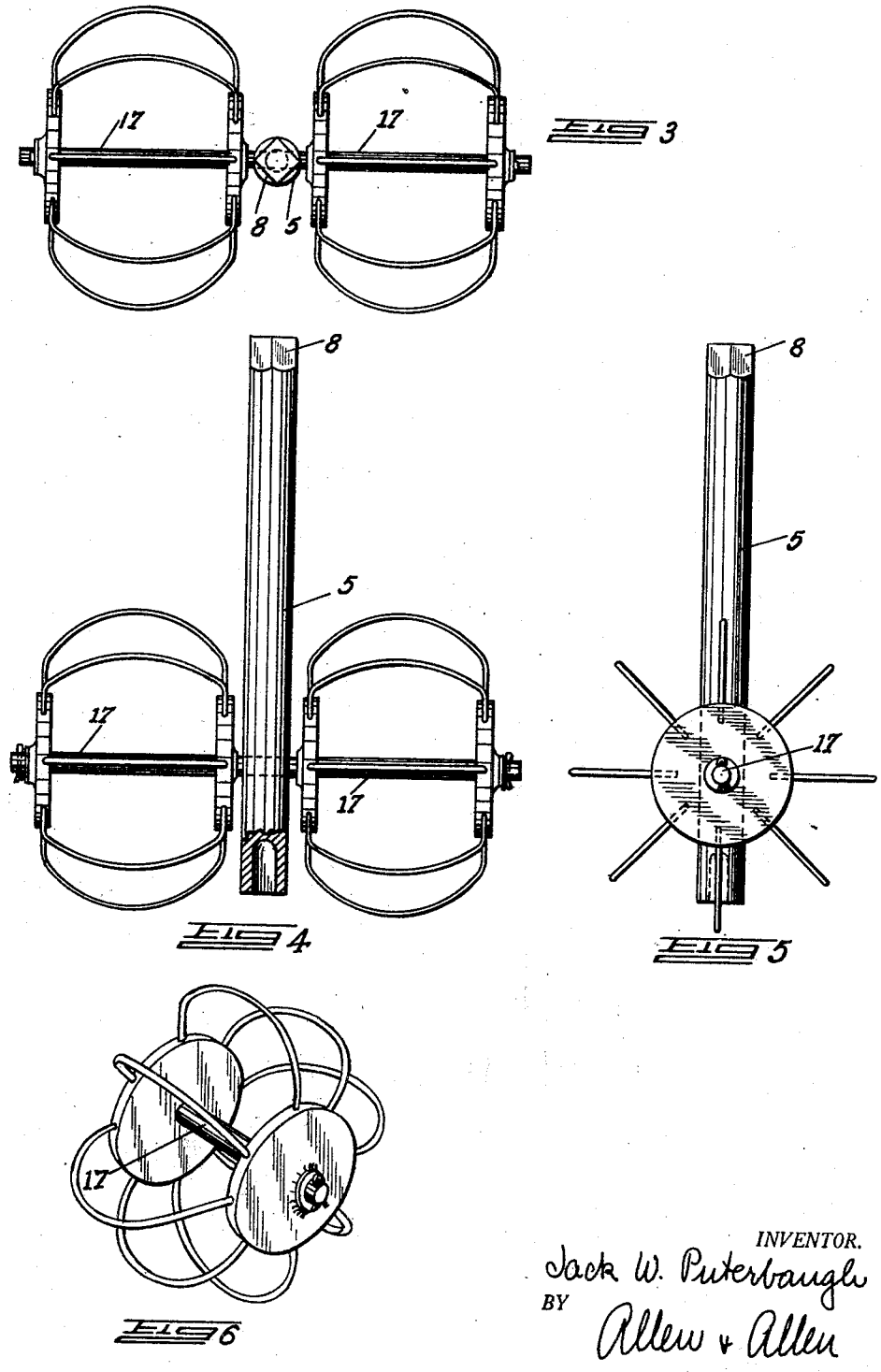

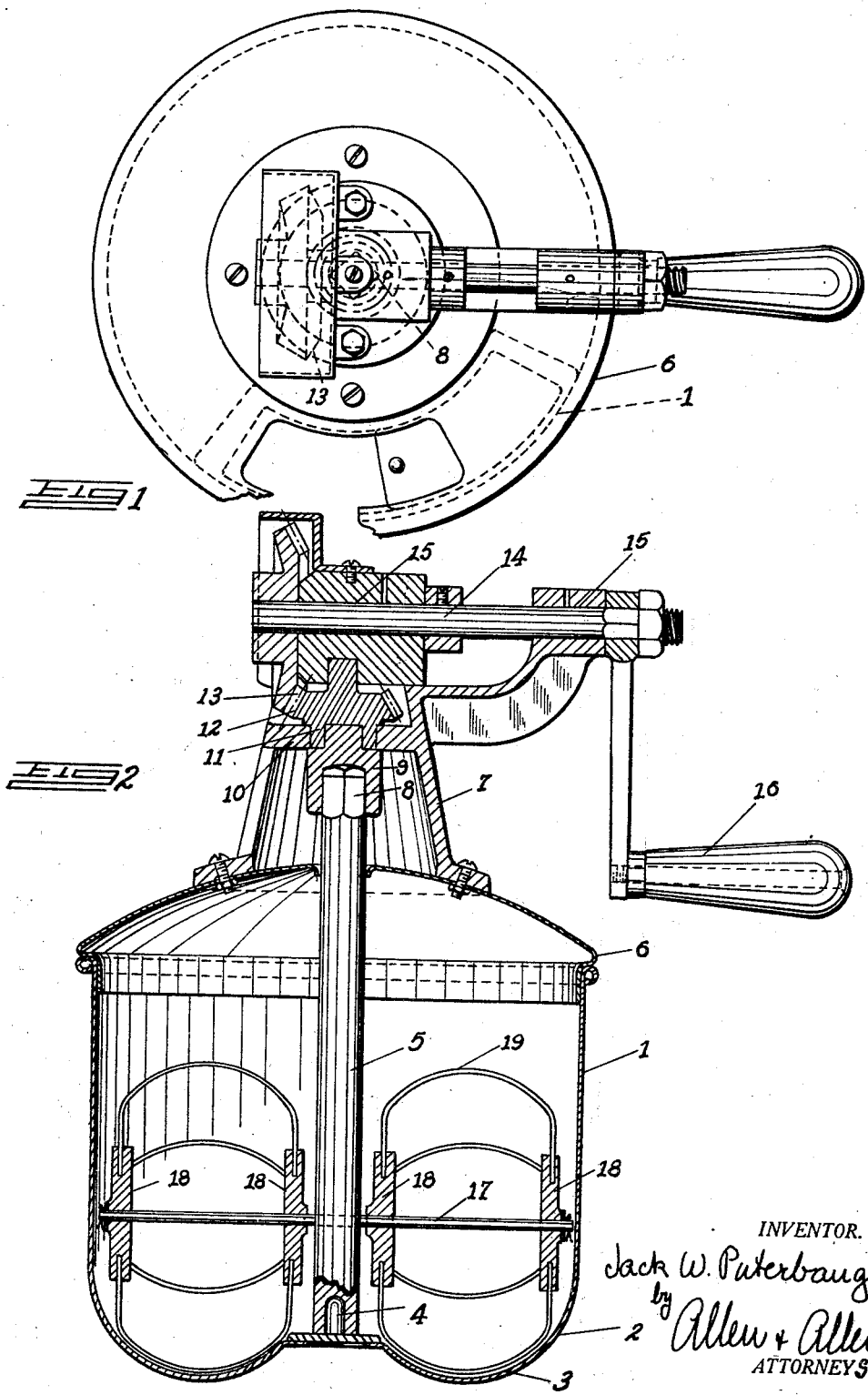

Patented Mar. 29, 1932

1,851,325

UNITED STATES PATENT OFFICE

JACK W. PUTERBAUGH, OF CINCINNATI, OHIO

MIXING MACHINE

Application filed April 8, 1929. Serial No. 353,536.

My invention relates to mixing machines of the type suitable for whipping cream, mixing mayonnaise dressing and the like, in which the ingredients are substantially liquid in form and are aerated and beaten into a froth during the mixing operation.

In whipping cream and making mayonnaise dressing, it has been very difficult in mixing machines heretofore on the market to obtain enough fluffing up of the product. It has often been the practice for a manufacturer to supply two machines, one for doing the body of the whipping, and the other for fluffing up the product sufficiently for the trade requirements after the main body of the mixing has been accomplished.

Broadly it is the object of my invention to provide a machine which will thoroughly mix and churn and give the desired aeration, and, at the same time, impart a desired fluffiness during the mixing operation.

Specifically it is my object to provide an agitator in a mixing machine having one or more mixing blades or devices which, during the rotation of the mixer agitator in one direction, impart sufficient movement of currents counter to the main direction of flow to cause a desired fluffing up. It is also my object to provide an agitator in which the counter-currents have movement imparted thereto by contact with the mixing mass of material within the mixer.

The above and other objects to which reference will be made in the ensuing disclosure I accomplish by that certain combination and arrangement of parts of which I have shown a preferred modification.

Referring to the drawings:—

Figure 1 is a plan view of the mixer.

Figure 2 is a central vertical section through the mixer.

Figure 3 is a plan view of the agitator.

Figure 4 is a front elevation of the agitator.

Figure 5 is an end elevation of the agitator.

Figure 6 is a perspective view of one of the mixing devices carried by the main agitator.

The mixing bowl illustrated has a cylindrical wall 1. The base 2 of the bowl is preferably elevated at its center and has a circular concave channel 3 extending from around the bowl in a concentric arrangement with its center the axis of the bowl. At the axis of the base there is preferably a pedestal or pin 4 which forms a pivot point for the agitator shaft 5 which extends up through a snug fitting detachable cover member 6 on which is mounted a frame 7 which forms the support for the gearing mechanism.

The top of the shaft is preferably squared as indicated at 8 so that it will register with a collar 9. The frame 7 has a cross member 10 through which extends the hub 11 connecting the collar 9 and a bevel gear 12. The bevel gear 12 meshes with another bevel pinion 13 mounted on a horizontal shaft 14 which extends through suitable bearings 15 and is provided with a handle 16 for rotating the agitator shaft.

The drive for the agitator may be varied in accordance with the particular use for which the machine is to be put and I have merely disclosed one simple type of driving mechanism. It will, of course, be entirely practical to mount a driving pinion on the shaft 14 and drive the mixer by means of a small electric motor.

The agitator shaft has a fixed cross shaft 17 mounted in an aperture extending therethrough and the agitating devices indicated in the drawings are mounted thereon. The agitators are composed of hub plates 18 rotatably mounted in spaced position on the shaft 17 and blades or wires 19 extend out in convex formations from the peripheries of the hubs connecting the spaced hubs in pairs, one on each side of the shaft 17 and thereby forming open baskets having curved exteriors. While I have shown a simple single wire mesh formation, it will be within the scope of my invention to provide cross wires and a more elaborate basket formation which may be desirable for certain types of mixing work.

In use the mixing machine is filled with the material to be mixed up to such a point as will about half way submerge the agitating devices. When the mixer shaft is rotated a main current of mixing material will be formed by the passage of the wires 19 through the material. Meanwhile the rotation of the shaft will cause the blades of the agitating devices to revolve in opposite directions when viewed from the same point on the shaft 17. The rotation of the agitating devices in spherical formation or currents having horizontal axes will be constantly carrying the mixed material from the bottom of the bowl up above the top level of the material so that in addition to the mixing a fluffing up of the material will be brought about.

Having thus described my invention, what I claim as new and desire to secure by Letters Patent, is:—

1. In a mixing machine, a bowl, a central vertical axial shaft, a cross shaft carried by said central axial shaft, an agitator carried on said shaft comprising agitating devices having members extending from said cross shaft in different directions throughout an arc of 360° and of such size as to extend below the level of material below said cross shaft and being freely rotatable, with contact with the material, counter to the main direction of rotation of said agitator.

2. In combination with a mixing bowl, a substantially vertical rotatable shaft therein, a horizontal shaft carried by said first named shaft, and agitating devices mounted on said horizontal shaft having members extending from said horizontal shaft in different directions throughout an arc of 360° so as to contact material in the bowl below said horizontal shaft, said agitating devices freely rotatable on said horizontal shaft, and being spaced on opposite sides of said vertical shaft, and being journaled on said horizontal shaft to rotate with contact with material within said bowl.

3. In combination with a vertical shaft in a mixing bowl, a horizontal shaft having an agitating device mounted thereon to which rotary movement is imparted by contact with material within the bowl while being carried by said vertical shaft, said device having members extending from said horizontal shaft in different directions throughout an arc of 360° so as to contact with material in the bowl below said horizontal shaft, said device having a balanced structure in which the weight of the upper and lower half is evenly distributed above and below said horizotal shaft.

JACK W. PUTERBAUGH.